United States Patent
Brenner et al.

(10) Patent No.: US 11,748,205 B2
(45) Date of Patent: *Sep. 5, 2023

(54) NETWORK INFORMED POLICY CREATION FOR OPTIMIZING MULTIPLE BACKUP OPERATIONS IN A MULTIPLE SOURCE SYSTEM

(71) Applicant: Dell Products L.P., Round Rock, TX (US)

(72) Inventors: Adam Brenner, Mission Viejo, CA (US); Arun Murti, Mission Viejo, CA (US); Mark Malamut, Aliso Viejo, CA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,681

(22) Filed: Apr. 15, 2022

(65) Prior Publication Data

US 2023/0096316 A1 Mar. 30, 2023

Related U.S. Application Data

(63) Continuation-in-part of application No. 17/507,000, filed on Oct. 21, 2021, now Pat. No. 11,556,427, which is a continuation-in-part of application No. 17/490,836, filed on Sep. 30, 2021.

(51) Int. Cl.
*G06F 11/14* (2006.01)

(52) U.S. Cl.
CPC ...... *G06F 11/1461* (2013.01); *G06F 2201/84* (2013.01)

(58) Field of Classification Search
CPC .................. G06F 11/1461; G06F 2201/84
See application file for complete search history.

(56) References Cited

U.S. PATENT DOCUMENTS

| | | | | |
|---|---|---|---|---|
| 9,454,324 | B1 * | 9/2016 | Madhavapeddi | ..... G06F 3/0604 |
| 2013/0205063 | A1 * | 8/2013 | Zhang | ........ G06F 11/1464 711/E12.008 |
| 2016/0026542 | A1 * | 1/2016 | Vasseur | ........ H04L 67/1095 714/4.11 |
| 2016/0342483 | A1 * | 11/2016 | Klingenberg | ....... G06F 11/1461 |
| 2018/0049223 | A1 * | 2/2018 | Wakumoto | ......... H04L 12/4675 |

* cited by examiner

*Primary Examiner* — Viet D Vu
(74) *Attorney, Agent, or Firm* — Staniford Tomita LLP

(57) ABSTRACT

Optimizing multiple backup operations for multiple sources by discovering shared data routes between sources and targets for backup operations performed in a certain time period. Backups using shared routes use a Best Time Algorithm that determines a size of a dataset to be saved an available bandwidth in each transfer window of the time period, and then determines an order of the backup operations based on first ordering the backups based on decreasing dataset size and second ordering the transfer windows in order of decreasing bandwidth, and matching the backups to the transfer windows in accordance with the first ordering and second ordering. The optimum time represents a time to initiate each backup of the multiple backups that results in a shortest data transfer time over the entire time period.

10 Claims, 14 Drawing Sheets

700

| Timestamp | Device | Bandwidth | | |
| --- | --- | --- | --- | --- |
| | | Incoming (Mbps) | Outgoing (Mbps) | Uplink (Gbps) |
| Monday 12:00AM | Primary | 500 | 1000 | 10 |
| Monday 12:00AM | Secondary | 800 | 1 | 1 |
| Monday 12:20AM | Primary | 200 | 1,000 | 10 |
| Monday 12:20AM | Secondary | 20 | 500 | 1 |
| Monday 12:40AM | Primary | 2,000 | 4,000 | 10 |
| Monday 12:40AM | Secondary | 200 | 1 | 1 |
| Monday 1:00AM | Primary | 8,000 | 5,000 | 10 |
| Monday 1:00AM | Secondary | 200 | 800 | 1 |

| Timestamp | Result | Selected |
| --- | --- | --- |
| Monday 12:00AM | 75GB (backup size) / 25MB/s = 50 minutes | No |
| Monday 12:20AM | 75GB (backup size) / 122.5MB/s = 10 minutes and 12 seconds | Yes |
| Monday 12:40AM | 75GB (backup size) / 100MB/s = 12 minutes and 30 seconds | No |
| Monday 1:00AM | 75GB (backup size) / 100MB/s = 12 minutes and 30 seconds | No |

| Backup | Transfer Window | Time Spent | |
|---|---|---|---|
| #1 | 12:00PM - 12:20PM | 6 minutes and 40 seconds | |
| #2 | 12:00PM - 12:20PM | 13 minutes and 20 seconds | Transferred 20GB, remaining 55GB |
| #2 | 12:20PM - 12:40PM | 8 minutes and 9 seconds | |
| #3 | 12:20PM - 12:40PM | 3 minutes and 32 seconds | |
| #4 | 12:20PM - 12:40PM | 2 minutes and 58 seconds | |
| #5 | 12:20PM - 12:40PM | 2 minutes and 13 seconds | |
| | Total | 36 minutes 52 seconds | |

| Backup | Transfer Window | Time spent |
|---|---|---|
| #2 | 12:20PM - 12:40PM | 11 minutes and 6 seconds |
| #3 | 12:20PM - 12:40PM | 3 minutes and 42 seconds |
| #4 | 12:20PM - 12:40PM | 2 minutes and 57 seconds |
| #5 | 12:20PM - 12:40PM | 2 minutes and 13 seconds |
| #1 | 12:40PM - 01:00PM | 2 minutes and 40 seconds |
| | Total Time | 22 minutes and 40 seconds |

| Transfer Window | Available Bandwidth | Max Data Transferable During Window |
|---|---|---|
| 12:00 - 12:20PM | 200Mbps | 30GB |
| 12:20 - 12:40PM | 500Mbps | 135GB |
| 12:40 - 01:00PM | 500Mbps | 75GB |
| 01:00 - 01:20PM | 200Mbps | 30GB |

| Backup | Transfer Window | Time Spent | |
|---|---|---|---|
| #Backup 1 | 12:00PM - 12:20PM | 20 minutes | Transferred 30GB, 70GB left |
| #Backup 3 | 12:00PM - 12:20PM | 0 minutes | 0GB transferred |
| #Backup 1 | 12:20PM - 12:40PM | 10 minutes, 22 seconds | 70GB transferred and finished |
| #Backup 3 | 12:20PM - 12:40PM | 9 minutes, 38 seconds | 65GB transferred, 15 GB left |
| #Backup 1 | 12:40PM - 01:00PM | 4 minutes | 15GB transferred and finished |
| #Backup 3 | 12:40PM - 01:00PM | | |
| #Backup 3 | 01:00PM - 01:20PM | | |
| | Total | 44 minutes | |

| Backup | Transfer Window | Time Spent | |
|---|---|---|---|
| #Backup 1 | 12:00PM - 12:20PM | | |
| #Backup 3 | 12:00PM - 12:20PM | | |
| #Backup 1 | 12:20PM - 12:40PM | 14 minutes 49 seconds | 100GB transferred and finished |
| #Backup 3 | 12:20PM - 12:40PM | 5 minutes, 11 seconds | 35GB transferred, 45GB left |
| #Backup 3 | 12:40PM - 01:00PM | 12 minutes | 45GB transferred and finished |
| #Backup 3 | 12:40PM - 01:00PM | | |
| #Backup 3 | 01:00PM - 01:20PM | | |
| | Total | 32 minutes | |

NETWORK INFORMED POLICY CREATION FOR OPTIMIZING MULTIPLE BACKUP OPERATIONS IN A MULTIPLE SOURCE SYSTEM

CROSS-REFERENCE TO RELATED APPLICATIONS

This application is a Continuation-In-Part application and claims priority to U.S. patent application Ser. No. 17/490,836, filed on Sep. 30, 2021 and entitled "Network Informed Policy Creation" and which is hereby incorporated by reference in its entirety. This application is further a Continuation-In-Part application and claims priority to U.S. patent application Ser. No. 17/507,000, filed on Oct. 21, 2021 and entitled "Multi-Backup Network Informed Policy Creation" now issued as U.S. Pat. No. 11,556,427 on Jan. 17, 2023, and which is hereby incorporated by reference in its entirety.

TECHNICAL FIELD

This invention relates generally to data protection systems, and more specifically to using network device information to optimize backup order in multi-backup and multi-source systems.

BACKGROUND

Backup software is used by large organizations to store their data for recovery after system failures, routine maintenance, archiving, and so on. Backup sets are typically taken on a regular basis, such as hourly, daily, weekly, and so on, and can comprise vast amounts of information. Backup programs are often provided by vendors that provide backup infrastructure (software and/or hardware) to customers under service level agreements (SLA) that set out certain service level objectives (SLO) that dictate minimum standards for important operational criteria such as uptime and response time, etc. The various protection requirements and different network entities, i.e., data sources and storage devices, dictate the various data protection policies that are defined and used in a backup system.

Backing up data involves a series of stages. The first stage might be copying the data in a form of a snapshot of a virtual machine, file system, block device, database, and so on. Another stage is the movement of that copy to another location like secondary storage. Customer environments might have more stages afterwards, such as tiering the data to the cloud or replicating the data for disaster recovery. A present problem is that current backup software treats all stages as a single stage as opposed to separate stages. That is, the backup software applies a defined backup policy on all stages as one process. In addition, the different backup stages are dependent on multiple systems, such as primary and secondary storage as well as other activity within the network. It is assumed that both primary and secondary systems are not single-use systems but rather have multiple purposes, such as serving multiple workloads, virtual machines, file systems, and so on. It can become unpredictable for system administrators to determine the load of a system at any given time. For end users, this means that problems can arise and manifest themselves into primary and secondary storage systems being overloaded during transfers. The result of overloaded systems is that backups may fail to run, backup service level objectives may not be met, replication may fall behind schedule or any combination of those.

Present tools available to network operators may help them select the shortest route or path within a network. These tools, however, only look at items like latency, number of dropped packets and other similar quality metrics. They lack other useful information, such as exact size of the transfer along with historical information to determine not only the best path but also the best time to transfer the data.

What is needed, therefore, is data protection software that provides an effective way to decouple the stages of backup and optimize data transfers across the network by determining best times to transfer data as well as best paths. What is further needed is a system that determines optimum backup order for multi-backup and multi-source systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 7 is a table that illustrates certain example historical operating information for a system, under an example embodiment.

FIG. 8 is a table that illustrates example results for the calculations for the historical data of FIG. 7, under an example embodiment.

FIG. 11A is a table illustrating times required to transfer backups in a default order in an example embodiment.

FIG. 11B is a table illustrating times required to transfer the backups of FIG. 11A using the multi-backup informed policy creation process of FIG. 10, under an example embodiment.

FIG. 15A is a table that illustrates an example time window of available bandwidth across a first network route, under an example embodiment.

FIG. 15B is a table that illustrates the time required to complete two backup operations under a straight backup schedule, under an example embodiment.

DETAILED DESCRIPTION

Figure 1A:
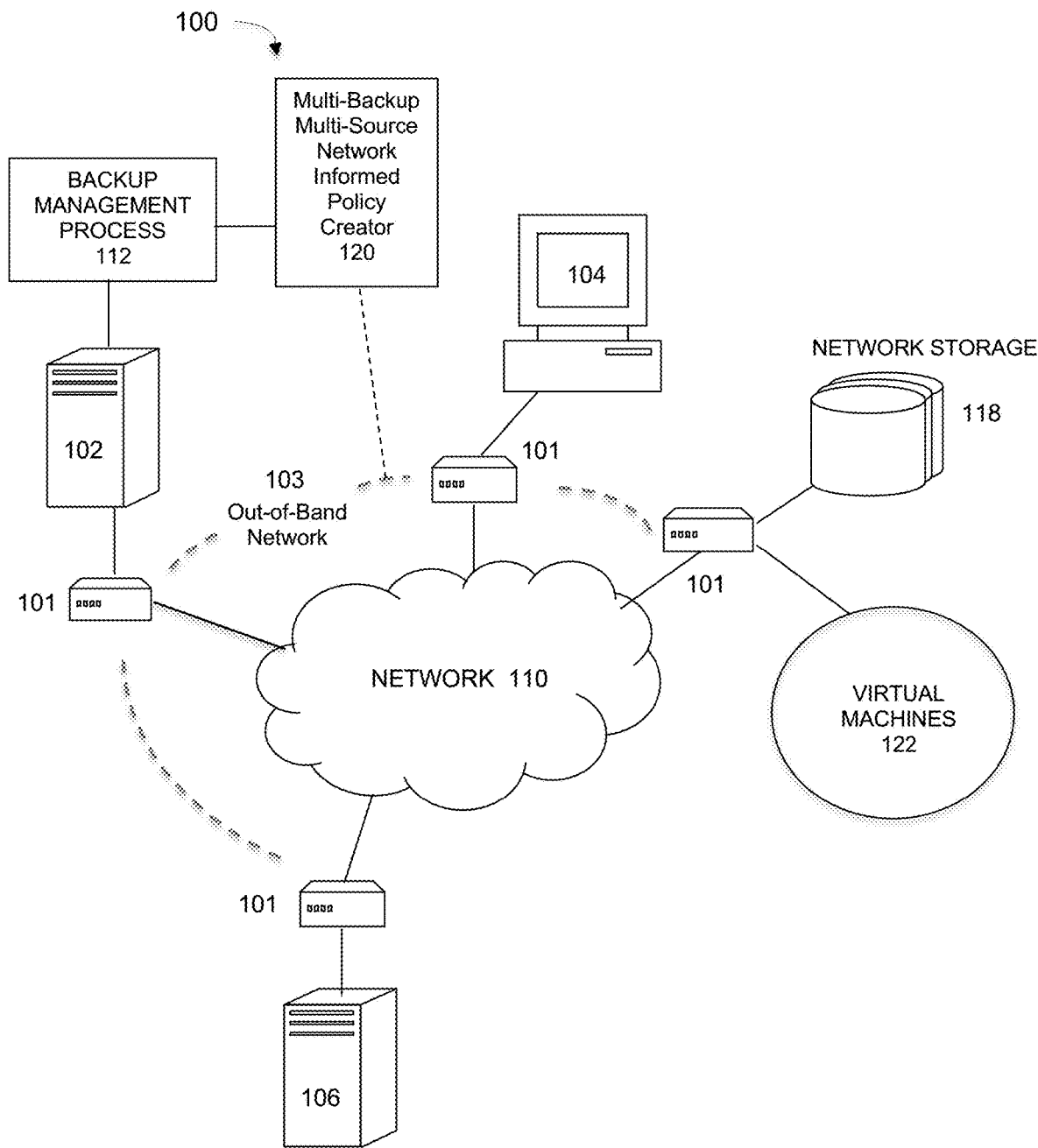
FIG. 1A is a diagram of a network implementing a network informed policy creator for a data backup system, under an embodiment.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud-based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Networking equipment such as managed switches, core routers and firewall devices have important configuration data that is stored on each device. These configurations include network (e.g., VLAN) tags, per port activation/link speed, domain routing protocol (e.g., BGP/OSPF) settings, firewall rules, high availability/redundancy settings, and so on, and are generally critical to running a network.

In embodiment, each network device (switch, router, firewall, etc.) has their management network port connected to an out-of-band network, which is a secured and limited access network used to configure and monitor all network devices, and which is not accessible by the production network. The production network is a series of networks that customers may sub-divide with the use of VLANs or additional routes.

FIG. 1A illustrates a computer network system that applies network informed policy creation for data protection using out-of-band network equipment devices, under some embodiments. For network 100, a number of network resources, such as server computers 102, 106, desktop or portable computers 104, storage devices 118, and other similar system resources.

For the embodiment of FIG. 1A, at least one server 102 may be a backup and/or storage server that executes a data storage or backup management process 112 that coordinates or manages the backup of data from one or more data sources to storage devices, such as network storage 118, client storage, and/or virtual storage devices 122. With regard to virtual storage, any number of virtual machines (VMs) or groups of VMs (e.g., organized into virtual centers) 122 may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 118, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to each other and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

For the embodiment of FIG. 1A, each computer, storage device, or other resource is connected to network 110 or other resources through some sort of network equipment or interface device 101. Such as device may be switch, router, modem, load balancer, buffer, or some other similar device that conditions the data or otherwise facilitates interface of the computer (e.g., 102, 104, 106) with the network 110. The interface may be embodied as an external device, or it may be at least partially integrated with the computer itself.

In an embodiment, the network equipment devices 101 are part of an out-of-band network 103, which is an abstraction of the actual network connectivity among these devices to show that they are subject to out-of-band management protocols that involve the use of management interfaces or serial ports for managing and connecting this equipment. Such out-of-band management usually involves the use of a dedicated management channel for device maintenance. It allows a system administrator to monitor and manage servers and other network-attached equipment by remote control regardless of whether the machine is powered on, or whether an operating system is installed or functional, and is in contrast to in-band management that involves simply connecting to a switch using normal network connectivity. Out-of-band management allows the network operator to establish trust boundaries in accessing the management function to apply it to network resources, and to ensure management connectivity.

In an embodiment, network devices 101 (also referred to as "network equipment" or "network equipment device" or "network interface devices") can be considered any of the following: managed switches, core routers, firewalls, load balancers, and so on. For the purpose of description, embodiments will be generally described with respect to managed switches, however it should be noted that embodiments are not so limited and may include any type of network equipment, interface, or infrastructure device.

Figure 1B:
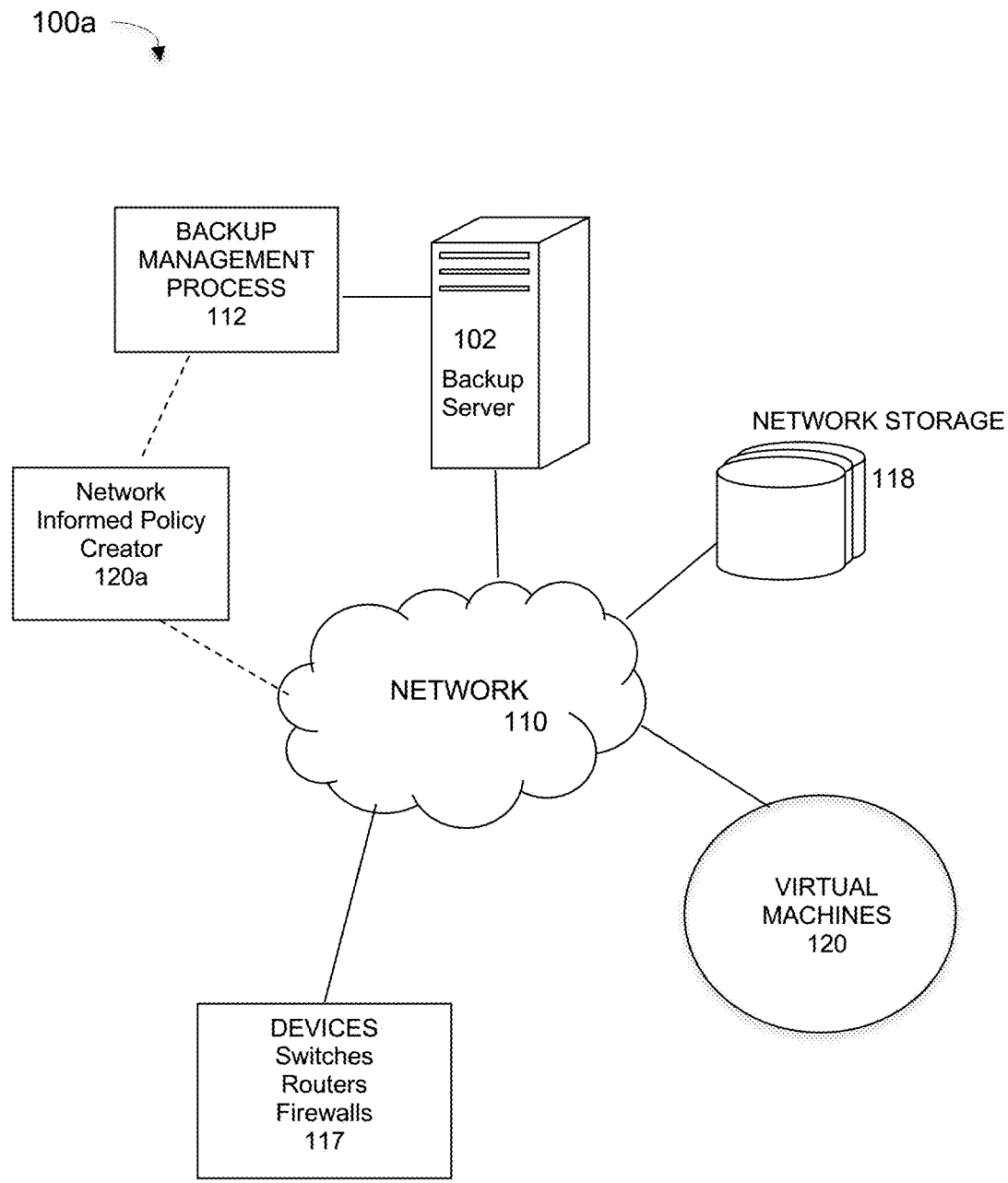
FIG. 1B is a diagram of a network implementing a network informed policy creator for a data backup system, under an alternative embodiment.

FIG. 1A illustrates an embodiment in which the network IPC 120 gathers network device information such as traffic flow through a special and separate out-of-band (OOB) network 103. Alternatively, the network IPC 120 can be deployed directly on the source and target, if allowed, to monitor network data flow of each source and target. FIG. 1B illustrates a computer network system 100a that implements one or more embodiments of implementing a network informed policy creator, under an alternative embodiment. In this embodiment, the network informed policy creator 120a is provided as a component or executable function provided in or accessible by the backup management process 112. The network includes devices 117 that may comprise switches, routers, firewalls, and so on. The network IPC 120a works through software agents installed on both the source and target. The agents gather the information that would normally be provided to the network switch as in the out-of-band network embodiment of FIG. 1A.

It should be noted that the term 'network IPC' may be used to refer to both a component (e.g., 120) or a process that is executed or performed by a hardware, software, or other processing element in system 100 or 100a.

As stated previously, current backup systems limit application of single policies on all stages of a backup operation thus leading to unpredictable load distribution and potential backup operation failure. Embodiments include a network informed policy creator (IPC) component or process 120 that is integrated into or accessed by the backup software 112. The network IPC process 120 connects with network devices 101 (e.g., managed switches, routers and firewall) to monitor the flow of data between source and destination. It is configured to recommend the transfer stage start time so it can be run later and independent of other stages. Process 120 also keeps a history of data to improve recommendations of the transfer stage within the transfer window based on flow of data and available resources on source and destination. Based on these three items, the network IPC 120 helps to back up the data during the transfer window and, when appropriate, transfer that data to the destination during the same transfer window. The network IPC 120 connects to network devices at both source and destination, and determines the impact of migrating the data based on historical trends and choose the best time to transfer data during the transfer window.

For the embodiment of FIG. 1A, the network IPC 120 may be implemented as a component that runs within a data protection infrastructure, and can be run as an independent application or embedded into an instance of data protection software 112 or as part of a data protection appliance. Any of those implementations may also be on-premise implementations on client machines within a user's data center or running as a hosted service within the cloud.

Network device information, such as traffic flow, is generally not available on the production ports of switches, but rather on a special and separate out-of-band (OOB) network 103. In order for the network IPC process 120 to gain access to the management interfaces, it needs to be dual-homed with access to the production network in order to communicate with backup software 112, and the management/out-of-band network 103, which network switches 101 are connected to. This type of setup requires additional security and considerations that are explained in greater detail below.

Implementing the network IPC 120 thus involves getting access to the management interfaces of network devices. The network IPC thus needs to be properly installed and implemented to be dual-homed, that is, to have access to both the out-of-band network and production network.

Figure 2:
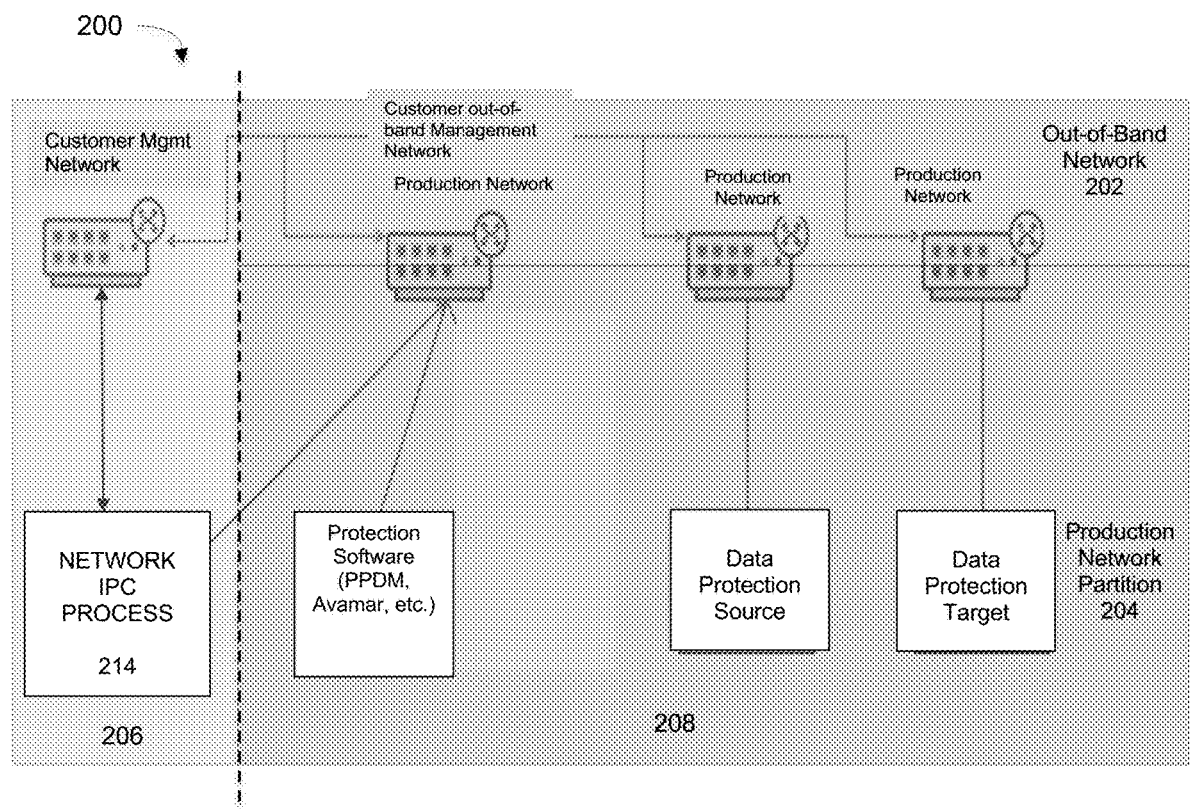
FIG. 2 illustrates an example user network that implements a data protection networking device process, under some embodiments.

FIG. 2 illustrates an example user network that implements a data protection networking device process, under some embodiments. System 200 represents a network comprising a number of user resources, such as production software, protection storage, client server computer, and devices in a production network 204. These resources are coupled to a network through network devices in out-of-band network 202, which is a secured and limited access network used to configure and monitor all network devices that is not accessible by the production network. Each network device (switch, router, firewall, etc.) has their management network port connected to the out-of-band network. The production network 204 comprises a data protection source and a data protection target, but embodiments are not so limited.

For the embodiment of FIG. 2, section 206 represents the network region where the network IPC process 214 is installed. This is a dual-homed component or process in that it has access to both the out-of-band network 202 and the production network 204. Region 208 includes the resources and network devices that are managed by network IPC process 214. The network IPC process 214 may be deployed externally as a VM/physical device within the network or it could be embedded within one or more of the network devices. There may also be multiple instances of network IPC in the customer network. The protection software and storage may be in the production network or in the out-of-band network, or it may even be hosted as a service. For purposes of description, IPC process 214 will be described as a single instance implementation that is dual-homed (i.e., access to out-of-band and production network) and a local instance of protection software and storage, though embodiments are not so limited.

Each network device (e.g., managed switch, a firewall or router) usually has a different method for programmatic control. The traditional industry standard for such control has been Telnet, which is used to administer commands on devices through the use of command line interfaces (CLIs). Due to the insecurity of Telnet, best practices have led to network devices being put on restrictive 'management' networks, such as an out-of-band network. As security improves, other methods such as SSH (Secure Shell) and Rest APIs were added, but the practice of putting the management interface on an out-of-band network is still a viable solution.

Depending on the network device, model, version and the customer configuration, the network IPC process 120 is configured to support each of the following controlling interfaces: Telnet, SSH, ReST API, RestCONF, and vendor specific or similar protocols. In an embodiment, the network IPC process supports a pluggable driver model which adds flexibility to handle a wide variety of network devices. Each driver will support a common set of use cases, such as: commit, backup, and restore operations.

Figure 3:
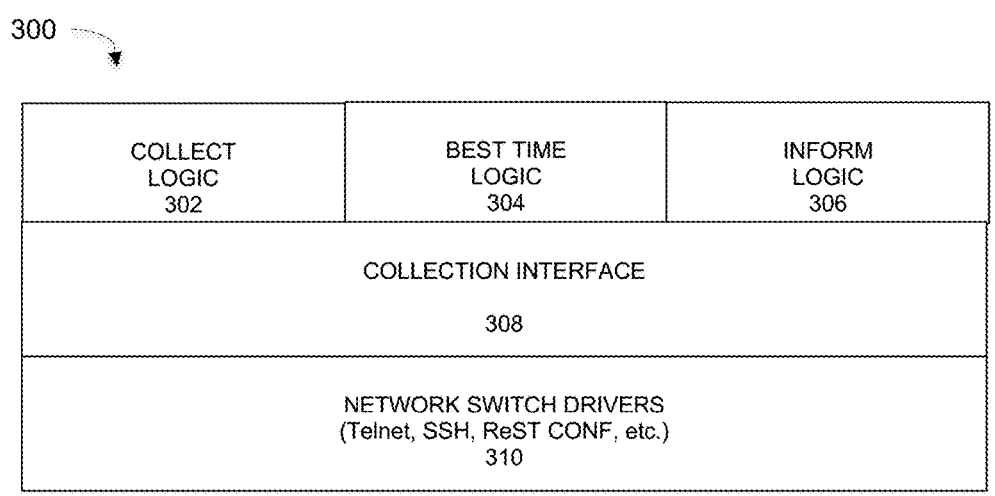
FIG. 3 is a sample driver model and implementation within the data protection networking device process software, under some embodiments.

FIG. 3 is a sample driver model and implementation within the network IPC software, under some embodiments. The software model 300 of FIG. 3 comprises a first layer having collect logic 302, best time logic 304 and inform logic 306; a collections interface layer 304; and a drivers layer 306. The network switch drivers 306 represent drivers that support the interfaces listed above, i.e., Telnet, ReST, CONF, and so on.

A typical system may have many network switches from various vendors that each have their own APIs and specific ways to communicate. For example, some network switches implement a standard called RESTCONF for device management, while other network switches require SSH or even Telnet to achieve the same functionality. For this reason, network IPC 214 is configured to use a pluggable driver model where each driver implements the specific network management protocol which is abstracted by the collection interface. The collection interface 308 offers a generic interface to all switches, regardless of their communication protocol where the process creates the three high level functions of the first layer, namely: collect 302, best time stages 304, and inform 306.

Figure 4:
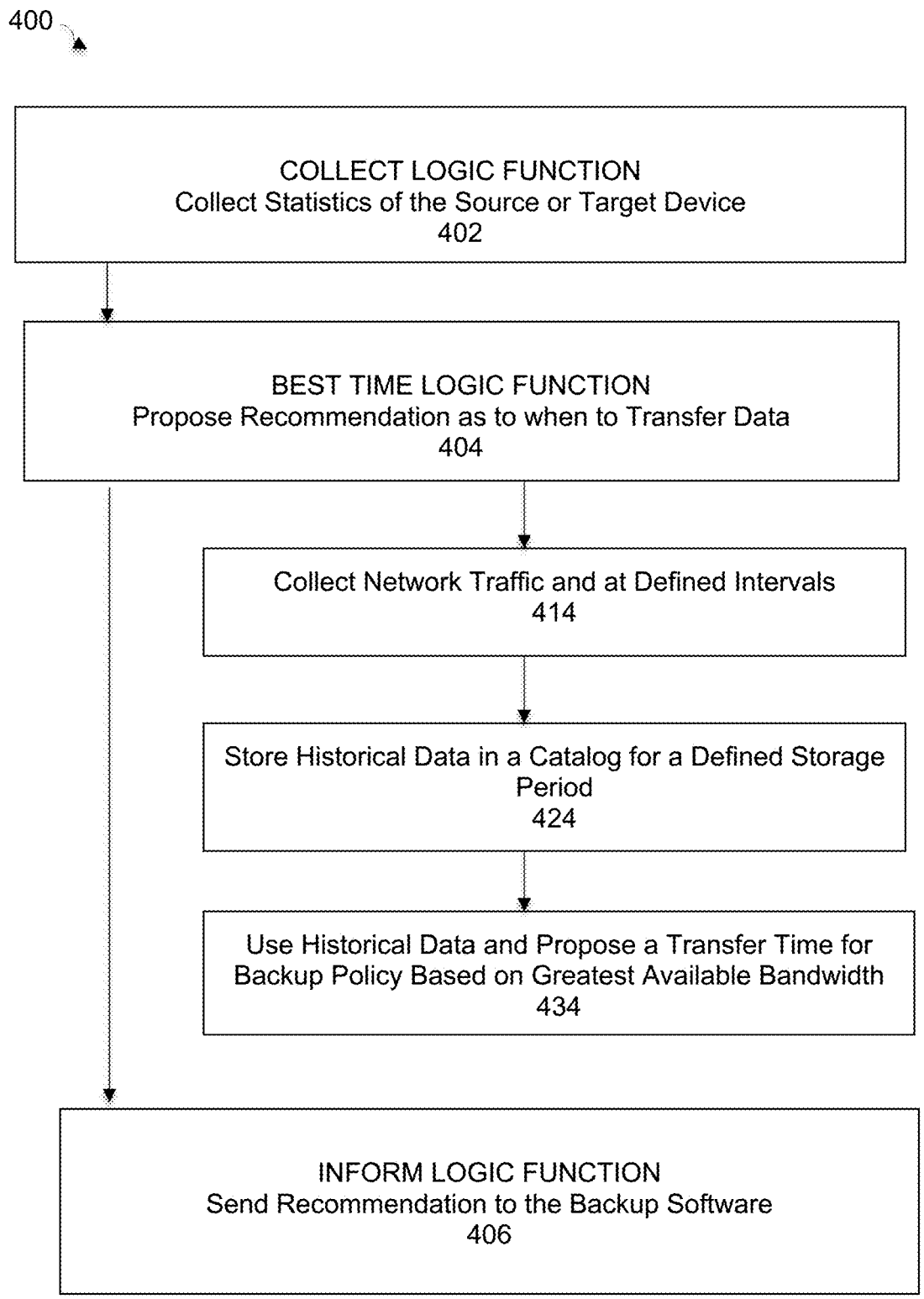
FIG. 4 is a flow diagram that illustrates major functions of the driver layers of the network IPC process, under some embodiments.

FIG. 4 is a flow diagram that illustrates major functions of the driver layers of the network IPC process, under some embodiments. As shown in process 400, the collect logic function 402 connects to each network device and collects the current statistics of the source or target device. The statistics include network bytes received and sent, and any other relevant information.

The best time logic function 404 uses the results from the collection function to propose or recommend an optimum time for the backup software to perform the data transfer of the backup operation.

The inform logic function 406 will send the recommendation proposed by the best time function to the backup software 112. Similar to pluggable drivers for network device management, the inform function 406 can be abstracted so that different protection software can be used with the network IPC.

A main process of FIG. 4 is the best time logic function 404, which provides recommendations as to when the backup software should transfer the data between source and target for a backup. As mentioned earlier, backups can be broken down into stages, such as first taking a snapshot of a block device, and second transferring the snapshot to secondary storage. Additional stages might follow, such as tiering the data offsite from secondary storage, and so on. The best time function works on the data transfer stage as opposed to the backup or any subsequent stage of the entire backup operation. Within every backup, there are multiple stages or steps, where the first step is to back up the data, and the second step is to transfer the data. The best time logic function operates on the second step of the data transfer wherein once the data has been backed up, it provides an option to transfer the data at separate time from the backup stage given the network resources.

In an embodiment, the system utilizes a Best Time Algorithm that works by figuring out how long the transfer will take for each available transfer window (the 20-minute configurable interval) and matching it to which backup it should transfer within that interval. It does this for each combination that makes sense and then picks the one with the fastest time In order to figure out when to optimally transfer the data, and as shown in FIG. 4, the best time logic function 404 performs several sub-steps of the Best Time Algorithm. The first main sub-step performed by the network IPC is to collect network traffic, such as incoming and outgoing bandwidth and the network uplink speed, 414. The network IPC collects the data continuously at intervals, such as every minute, or similar time period. The network IPC collect this data using the collect function 402.

This network traffic information is then stored as historical data points in its own catalog, 424. The storage period can be defined as any appropriate length of time, such as 30 days, 60 days, or any other defined period.

Once the data has been stored, the network IPC will look at the historical data and, based on the backup policy it is operating on, will propose a transfer time where the greatest amount of network bandwidth is available between source and destination, 434. This proposal does not eliminate any bottlenecks that might encountered by performing the transfer at the proposed time, but rather it goes for a best effort. The proposed time is then sent as a recommendation to the backup software by the inform logic function 406.

Figure 5:
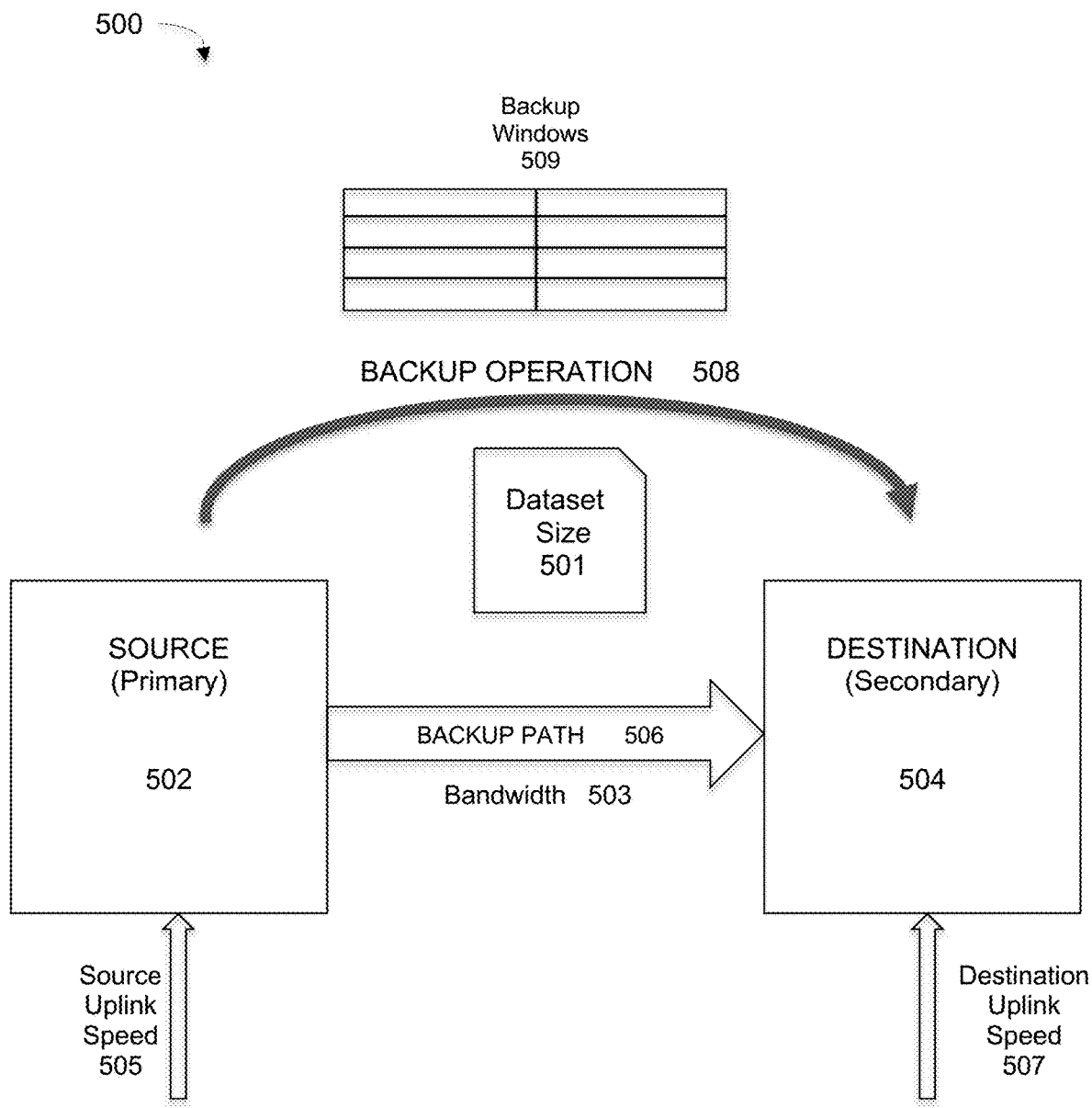
FIG. 5 is a block diagram illustrating some components and parameters for the network IPC process, under some embodiments.

As shown in FIG. 4, the network IPC determines the greatest amount of bandwidth available between source and destination as part of the calculation of the best time for the data transfer. This calculation depends upon several operating and configuration parameters of the backup network and backup dataset. FIG. 5 is a block diagram illustrating some components and parameters for the network IPC process, under some embodiments. FIG. 5 illustrates a system 500 comprising a data source 502 and storage device destination 504 for which a backup operation 508 transfers a set of data to be backed up (dataset) 501 from the source 502 to the destination 504. Several different network paths may be available between the source and destination, and for purposes of description, a defined backup path 506 (which is typically, but may not always be a shortest path) is assumed as the path used for the backup operation 508.

The backup operation 508 is typically executed by the backup software according to a backup schedule that dictates routine backups to be made at regular periodic intervals, e.g., hourly, daily, weekly, etc. Depending on the size of the dataset and backup type (e.g., full, incremental, differential, etc.), a backup operation may take a minimal or significant amount of time. Typically, the backup periods are chosen so that a full backup may be completed within the time before the next scheduled backup. The backups may be taken at a set time during the period, such as 12:01 am every day. However, backup software often provides a number of different backup (or transfer) windows 509 to be selected for the backup operation, thus allowing for some degree of optimization with respect to when the backup operation is performed within the entire backup period. Depending on different system constraints, operating conditions, device health, and so on, certain transfers may be better than others for a certain scheduled backup operation.

Unlike present backup optimization techniques that focus on selecting the shortest path between the source and destination, the network IPC process selects the best time to transfer the data from among different possible transfer windows based on data transfer sizes and historical data about network bandwidth conditions. Thus, for a particular source 502 and destination 504 across a backup path 506, the network IPC process will process certain historical bandwidth 503 metrics, along with source uplink speeds 505 and destination uplink speeds 507 to determine the best time within the backup windows to transfer a dataset 501 having a particular size.

Figure 6:
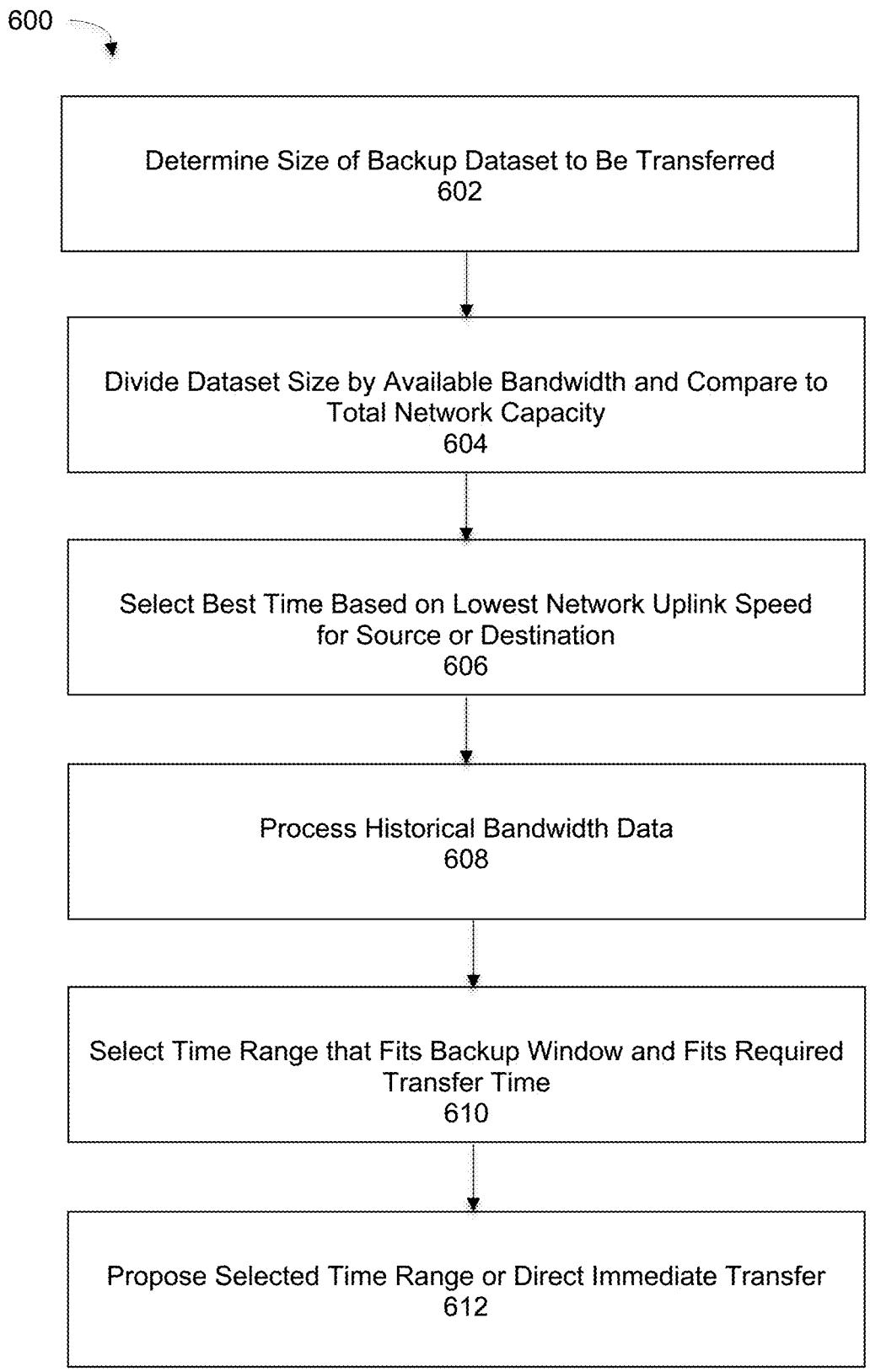
FIG. 6 is a flowchart illustrating a method of calculating the greatest available bandwidth for the optimal transfer time proposal, under some embodiments.

As shown in FIG. 4, a major step (434) in determining a best time to recommend as a backup time is using historical data based on the greatest bandwidth 501 available for the backup path 506. FIG. 6 is a flowchart illustrating a method of calculating the greatest available bandwidth for the optimal transfer time proposal, under some embodiments. For each source and destination, process 600 determines the size of the data that will be transferred, 602. This is generally provided from an earlier stage where the snapshot was taken by the backup software. The best time logic function 404 determines the best time to perform the data transfer data stage after the backup or snapshot phase. The size of the dataset is determined based on the backup stage for the dataset that is then transferred from primary to secondary storage.

FIG. 6 represents a method describing implementing a Best Time Algorithm in the case of a single backup operation between a single source and a single destination. Such an algorithm will be expanded as described later to cover multiple backups using different backup windows, as well as multiple data sources having multiple backups.

The process 600 then takes the total size of the backup and divides it by the available bandwidth for comparison to the total network capacity, 604. With respect to calculating the total network capacity, the network IPC gathers statistics from the network switches about the source and target machines. The network switch provides the uplink speed (e.g., 1 Gbps, 10 Gbps, etc.). Along with that, it also provides how much of that uplink is used (e.g., 500 Mbps, 5 Gbps, etc.). This information is collected in the historical database. How often this information is collected is selected through a user configurable setting. In this example, the time period is every 20 minutes, though other periods are also possible.

Given this information, the process knows the maximum bandwidth available on source and target (destination), which is the uplink speed number. Then for a given time range, the database provides the past historical usage. The difference represents what is left as available to the system. The process uses the lowest bandwidth available between source and target for the entire transfer, as that is the bottleneck between the two systems. The result of this calculation is a time value. If the source and destination network uplink speeds differ from one another, then the lowest network uplink speed is selected, 606.

For the transfer windows provided by the backup software, the process 600 processes the historical bandwidth data 608, and for the given time period and selects the time that (1) fits the transfer window, and then (2) fits the required transfer time (i.e., how long the transfer will take), 610. The selected time is then sent to the backup software as the recommended proposal. If both conditions (1) and (2) above cannot be met, the network IPC process will direct the backup software to start the transfer immediately, 612.

For the source, the network IPC will only look at historical data that matches outgoing bandwidth. For the destination, the network IPC will only look at historical data for incoming bandwidth.

This process 600 of FIG. 6 can be expressed by the following best time equation: Best_Time=(total_backup_size)/(network_uplink_speed−available bandwidth) over a specified period, e.g., 30 days.

Embodiments will be further described with respect to a specific example as illustrated in FIGS. 7 and 8. FIG. 7 is a table 700 that illustrates certain example historical operating information for a system, under an example embodiment. Table 700 lists certain bandwidth 702 and uplink 704 metrics for a primary (source) device and a secondary (destination) device for four different transfer windows. The transfer windows are timestamped as Monday 12:00 AM, Monday 12:20 AM, Monday 12:40 AM, and Monday 1:00 AM. Table 700 represents just a portion of an entire historical set of data over an entire backup period of 30 days or similar. The granularity of 20 minutes between each transfer window represents a defined collection interval for the network IPC process, and can be changed to any appropriate value, such as 10, 15, or 30 minutes, and so on.

The historical information of example table 700 is recorded in the network IPC catalog and stored in a database accessible to both the primary and secondary devices. This historical information is then applied to a defined or provided backup policy. For example, such a policy may dictate the backup software to back up a block device of 75 GB in size between the one-hour window of 12 AM-1 AM. From the table 700, it can be seen that the primary device has a 10 Gbps uplink while the secondary device has a 1 Gbps uplink and the collection interval for the network IPC is every 20 minutes. From the defined policy, a next backup is scheduled to occur at 12 AM on Monday. Based on the process of FIG. 6, the network IPC will consult the historical database 700 and perform certain calculations as follows.

The primary device has a network uplink for 1 Gbps even though the primary device has a 10 Gbps uplink. This is because the secondary device has a network uplink of 1 Gbps and the better time calculation in step (2) states the lowest uplink value is used.

The available bandwidth at 12 AM on the primary device 9,000 Mbps or 9 Gbps. This value is calculated by taking 10 Gbps uplink and subtracting the 1,000 Mbps outgoing bandwidth. The available bandwidth at 12 AM on the secondary device is 200 Mbps. This value is calculated by taking the 1 Gbps uplink and subtracting the 800 Mbps of incoming bandwidth. Due to 200 Mbps being the lowest value between primary and secondary, 200 Mbps is used as the transfer rate. The Mbps value is converted to MB/s as follows: 200 Mbps=25 MB/s. The network IPC process uses the formula defined above and plugs in the values: 75 GB (backup size)/25 MB/s=3000 seconds or 50 minutes. This 50 minutes is the amount of time the backup will take for the 75 GB dataset.

The network IPC process then performs the same calculation at the 12:20 AM, 12:40 and 1 AM entries. FIG. 8 is a table 800 that illustrates example results for the calculations for the historical data of FIG. 7, under an example embodiment. As can be seen in FIG. 8, the network IPC process will determine is the optimal transfer window can occur anytime between 12:20 AM-12:40 AM as the process has calculated that the transfer can be completed within 10 minutes and 12 seconds if this time window is selected. If the backup software did not use the network IPC process, it would start the transfer stage as soon at 12 AM and would take as long as 50 minutes. This is because less bandwidth being available at 12 AM. In addition, transferring at 12 AM might cause a chain reaction of other systems being slowed down that would further cause slowness and ripple throughout the network. Thus, in this example, a later time window is better than an earlier time window and allows the backup operation to complete faster even though it starts later.

Multi-Backup Network Informed Policy Creation

Embodiments above describe a best-time algorithm within a network informed policy creator system in which an entire period is broken up into blocks of time (transfer or backup windows) where a constant bandwidth is available. An optimal time to transfer a single backup over the network is then calculated. Such embodiments are extended in the multi-backup network informed policy creator 120 to take into account multiple backups occurring at the same or similar time between a source and destination so as to produce an optimal time to transfer over the network all backups rather than just a single backup.

Figure 9:
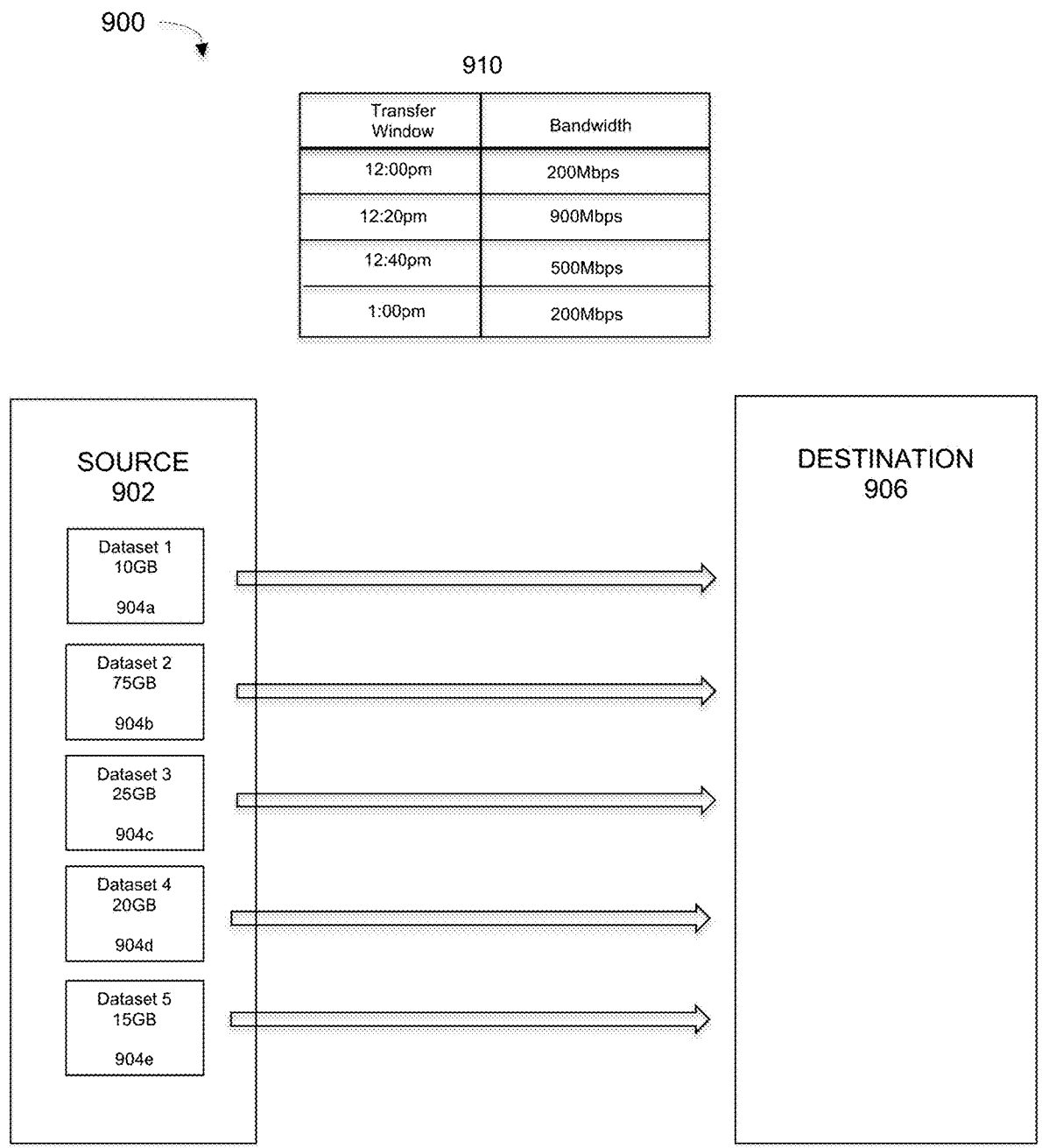
FIG. 9 illustrates an example scenario of multiple backups between a source and destination, under some embodiments.

FIG. 9 illustrates an example scenario of multiple backups between a source and destination, under some embodiments. Diagram 900 shows a source 902 having five example datasets (e.g., datasets 1 to 5), 904a-904e. Any number of backups are possible, and each backup can be the same or different sizes. For the example shown, the datasets vary from 10 GB to 75 GB in size, as shown. As shown, the different datasets 904a-e are all to be backed up at the same time according to a specific user-defined backup schedule 910. The backup schedule thus defines a period during which the multiple backups are performed to transfer the datasets from source 902 to destination 906, such as, daily, weekly, etc. The backup schedule may include a number of different backup or transfer windows during which the data can be transferred within the specified period. For example, for a daily backup, there may be four (or similar number) transfer windows available at a particular time of day (e.g., 12 PM or 12 AM). The transfer windows are each of a set period of time, such as 20 minutes or similar. The transfer can be initiated during any transfer window from the start time (12 PM) and must be complete before the end of the final transfer window to satisfactorily backup all the datasets to the destination 906 for the current backup period.

Although the duration of the transfer windows are all the same, their bandwidth capacities may not be the same due to factors such as network traffic, system load and configuration, and so on. Thus, for the example shown in FIG. 9, four example 20 minute transfer windows are shown starting at 12:00 PM. The available bandwidth for the 12:00-12:20 PM window is 200 Mbps, the available bandwidth for the 12:20-12:40 PM window is 900 Mbps, The available bandwidth for the 12:40-1:00 PM window is 500 Mbps, and the available bandwidth for the 1:00-1:20 PM window is 200 Mbps. FIG. 9 is shown for purposes of illustration only, and any other configuration of source, destination and network links is also possible.

The multi-backup network informed policy creation process 120 utilizes the fact that the minimum time to transfer backups can be achieved by performing the backups within a defined transfer according to the largest backup size (e.g., 904b in FIG. 9) and the largest available bandwidth (e.g., 12:20 PM in FIG. 9). Process 120 matches these two relevant factors so that the largest dataset is backed up during the transfer window with the greatest available bandwidth so that all of the transfers are fit within high bandwidth window or windows. This minimizes the overall backup time, even if it results in a later transfer window within the backup period being used.

In an embodiment, the multi-backup informed policy creation process 120 keeps historical records of bandwidth available between source and destination for each backup system. By using these historical records, process 120 can leverage this information beyond just a single backup. Certain parameters regarding the historical database are configurable, such how long historical records are kept (duration), amount of data that is kept (depth), and so on. This allows a user of the system to control the overall accuracy of the historical information.

Table 910 illustrates certain example historical operating information for system 900, for four different possible transfers within a backup schedule. The transfers are time-stamped 12:00 PM, 12:20 PM, 12:40 PM, and 1:00 PM. Table 910 represents just a portion of an entire historical set of data over an entire backup period of 30 days or similar. The granularity of 20 minutes between each transfer represents a defined collection interval for the network IPC process, and can be changed to any appropriate value, such as 10, 15, or 30 minutes, and so on. The average bandwidth recorded for each of the transfers is shown as 200 Mbps, 900

Mbps, 500 Mbps, and 200 Mbps, respectively. For this example, it can be seen that the 12:20 pm transfer provides the greatest bandwidth capacity (900 Mbps).

Given the different size datasets and the different bandwidth capacities available for different transfers within the backup period, different orderings of the backups may produce different time durations. Embodiments of the multi-backup IPC process 120 uses historical data and current system characteristics to determine the optimum scheduling of the various backups based on the different bandwidth and dataset size characteristics to possibly improve the performance of a simplistic default or rigid scheduling of backup jobs in a set order.

Figure 10:
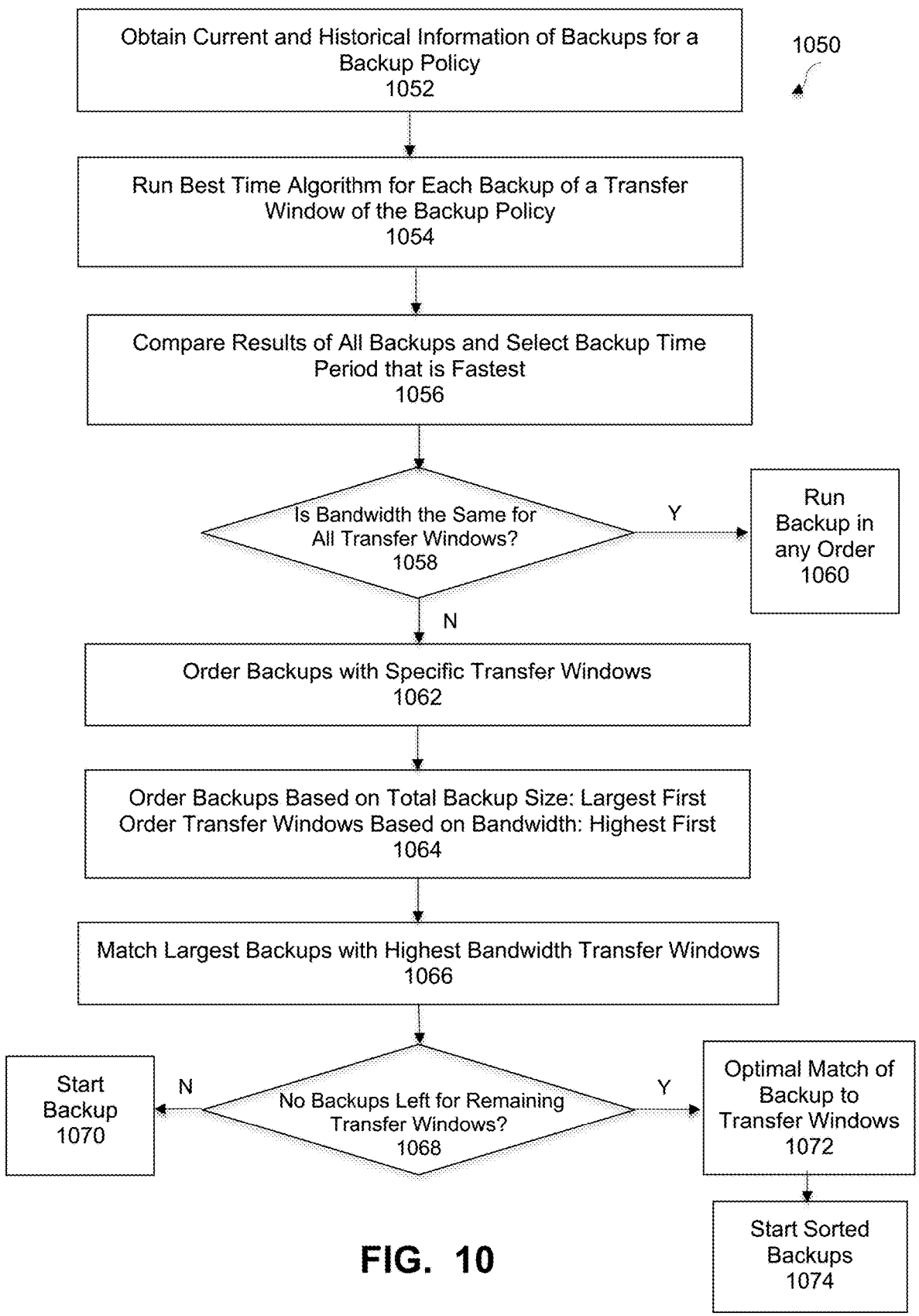
FIG. 10 is a flowchart illustrates performing a multi-backup network informed policy creation process, under certain embodiments.

FIG. 10 is a flowchart illustrates performing a multi-backup network informed policy creation process, under certain embodiments. Process 1050 begins with obtaining current and historical information of backups for the a given backup policy, 1052. For a given backup policy, this involves getting a list of: all backups, the amount of data transferred over the last 30 (or other similar) number of days, the policy transfer window, the source machine, the destination machine, among other relevant information. This comprises the current information of the system.

For a given policy transfer window, the process runs the Best Time Algorithm for each backup for the transfer window, 1054. The process then compares the results of all backups and select the backup transfer time period that is the fastest, 1056. This comprises the historic information of the system.

In step 1058 it is determined if the same amount of bandwidth is available for entire transfer window. That is, each of the transfer windows (e.g., 910) have equal bandwidth capacities. If so, the backups can be run the backup in any order as the backup time duration cannot be further shortened, 1060.

If, however, the same amount of bandwidth is not available over the transfer window, the backups are ordered or re-ordered into different transfer windows, 1062. This ordering proceeds as follows: (1) order backups based on total backup size with the largest backup first, and (2) order transfer windows based on bandwidth with the highest bandwidth windows first, 1064.

The process then matches the largest backups with the highest bandwidth transfer windows to backup first, 1066, and repeats until till there are no more backups or transfer windows. In decision block 1068 it is determined whether or not backups are matched with zero or more transfer windows remaining. That is, do any backups still exist for the remaining transfer windows. If not, and the transfer windows run out before backups, the backup is started with the present transfer window, as no ordering or re-ordering will complete all backups within all the transfer windows, 1070. If, however, the backups run out before transfer windows, the optimal solution has been found in the last match of the backup to the transfer window, 1072. The backups are then performed as re-ordered (or sorted) by the matching process, 1074.

Embodiments are described by way of an example case as illustrated in FIG. 9. As shown in FIG. 9, there are five backups that total 145 GB (10 GB+75 GB+25 GB+20 GB+15 GB) of data to be transferred between 12 PM and 1:20 PM (transfer windows) with the following respective bandwidths available: 200 Mbps, 900 Mbps, 500 Mbps, and 200 Mbps.

The system has been configured to record the bandwidth every 20 minutes and save them over a period of time. The network IPC produced the transfer windows 910 with the average bandwidth available. The IPC process 120 determines which backup should go with which transfer window. As a first step, the normal case of starting transferring the backups in a default dataset order (i.e., 1 to 5) is calculated. This example is illustrated as Table 1100 of FIG. 11A. In this ordering, it would take 36 minutes and 52 seconds to transfer all the backups, with the backup of dataset 2 requiring two transfer windows in a row (12:00 PM and 12:20 PM). This represents a default situation of taking backups in order.

In contrast, the multi-backup IPC process of FIG. 10 produces a modified best time result of the ordering illustrated in Table 1110 of FIG. 11B. The total time required for all five backups is 22 minutes and 40 seconds, when the backups are executed in the order shown and in the transfer windows shown. For this example, the backup of dataset 2 is ordered to be first due to its biggest dataset size (75 GB), and it is scheduled in the 12:20 PM transfer window as this is the transfer window with the largest bandwidth (900 Mbps). The next biggest backup is for dataset 3 (25 GB) and this is also placed in the 12:20 PM transfer window. As shown in Table 1110, this transfer window can also accommodate the backups for datasets 4 and 5, while the remaining backup (dataset 1) is performed in the next transfer window (12:40 PM). This illustrates a case in which starting the backup in a later transfer window that has a high capacity and starting with the largest dataset can result in an overall lower total backup time as compared to simply starting the backup in with the first transfer window and in a default backup order. FIGS. 11A and 11B are provided for illustration only, and any other backup configuration is possible.

As shown in the examples of FIGS. 11A and 11B, the multi-backup IPC process transfers the data in less time and reduces network congestion by more efficiently using all of the bandwidth that is available in the different transfer windows and by changing the default order of backup job execution.

Multi-Backup, Multi-Source Network Informed Policy Creation

The multi-backup embodiment described above provides a network informed policy system that takes into account transferring multiple backups from a single system to a single target. This provides an optimized transfer order of backups given both limited time and fixed bandwidth windows by permutating the various combinations of time windows and backups to transfer, which results in a list of backups that would transfer in the quickest time possible using the available bandwidth in the network.

Further embodiments enable the transfer of multiple backups from multiple sources to multiple target systems in a multi-backup, multi-source network IPC component 120. Such a system optimizes which backup from which source should proceed first given that common (or shared) network routes between many sources and targets can be a significant bottleneck.

Figure 12:
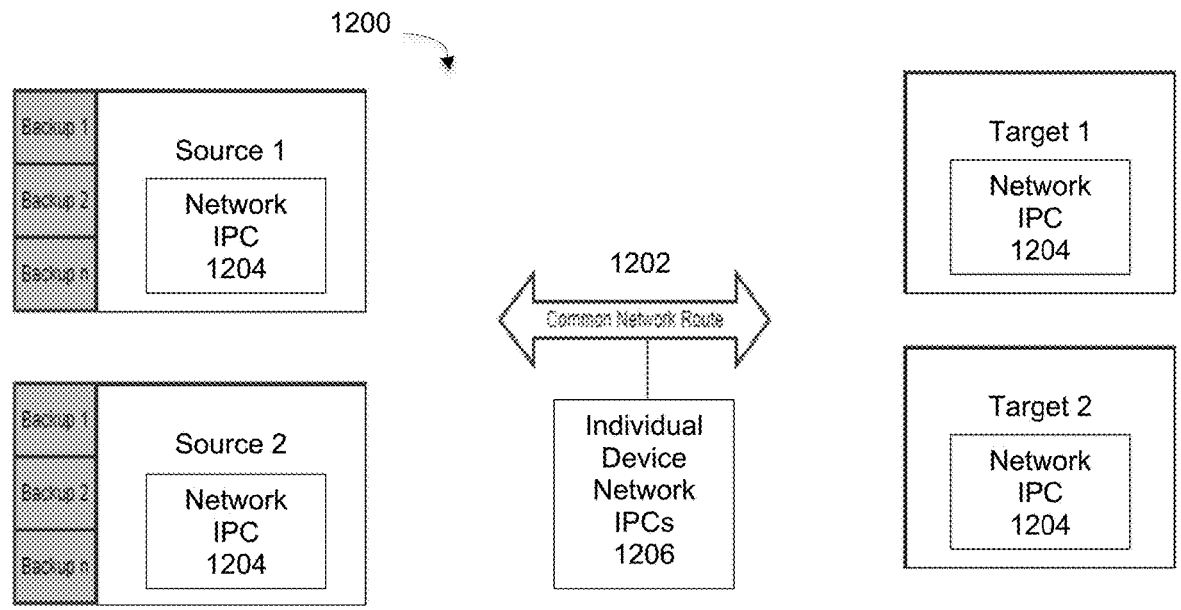
FIG. 12 illustrates a multi-backup, multi-source scenario, under some embodiments.

FIG. 12 illustrates a multi-backup, multi-source scenario, under some embodiments. For the example 1200 of FIG. 12, two data sources Source 1 and Source 2 backup data through n respective backups (denoted Backup 1, 2, . . . , n) to Target 1 and Target 2 over a common network route 1202. The different backups from the two sources are used to transfer the data to either or both of the targets depending on the source and destination specified in or for each backup operation. Although FIG. 12 shows the case of two sources and targets, any practical number of sources and targets can be used, and the number of targets may differ from the number of sources so that there may be N different sources and M different targets.

As described above, the network IPC process can be used to determine an order of one or more data backups from a single source to a single target. In a system of multiple sources and targets using a single common network route 1202, certain data transfers may cause contention or network conflicts that manifest as bottlenecks on the network. For example, in system 1200, the system may determine that Backup 1 from Source 1 should be transferred before Backup 2 from Source 2, regardless of the target, because of a bottleneck in the network that is not necessarily known to the user. The multi-backup, multi-source network IPC 120 is configured to optimize the backup schedule to accommodate such a bottleneck or scheduling conflict situation by possibly advancing or delaying a scheduled backup window from a particular source to a target.

For this embodiment, the system utilizes a modified network IPC process that adds certain process and system requirements and configurations. First, the Best Time Algorithm must have knowledge of the entire route from source to destination and each hop (switch) along the path 1202. The network IPC process needs to collect each network hop's bandwidth available and present that information to the Best Time Algorithm (e.g., process 1050 of FIG. 10).

For this embodiment, therefore, each network device including sources and destinations, as well as all devices along the network path has a respective network IPC component 1204 or 1206 installed, as shown in FIG. 12. Whereas other embodiments required a network IPC component to be installed only in the source and destination network switches to monitor the bandwidth available for the source and target, the embodiment of FIG. 12 has a network IPC 1206 installed at each network device along the path between source and destination, to capture the available bandwidth. Depending on system scale, this could require upwards of hundreds or more network IPC installations.

Because network routes are subject to change and because of the sheer volume of devices they might include, the network IPC uses well known network discovery tools such as Address Resolution Protocol (ARP), Internet Router Discovery Protocol (ICMP), traceroute, and similar methods, to assist users in determining where the network IPC processing components should be installed. For example, a network IPC installed at Source 1 might use a network discovery tool to connect to Target 1. In the process, it may then discover that there are three hops between Source 1 and Target 1. Those three hops are then candidates where the network IPC components should be installed. Once the network IPC is installed at each hop, it is able to collect the standard information, such as available bandwidth, port speed, and historical information, as described above.

Figure 14:
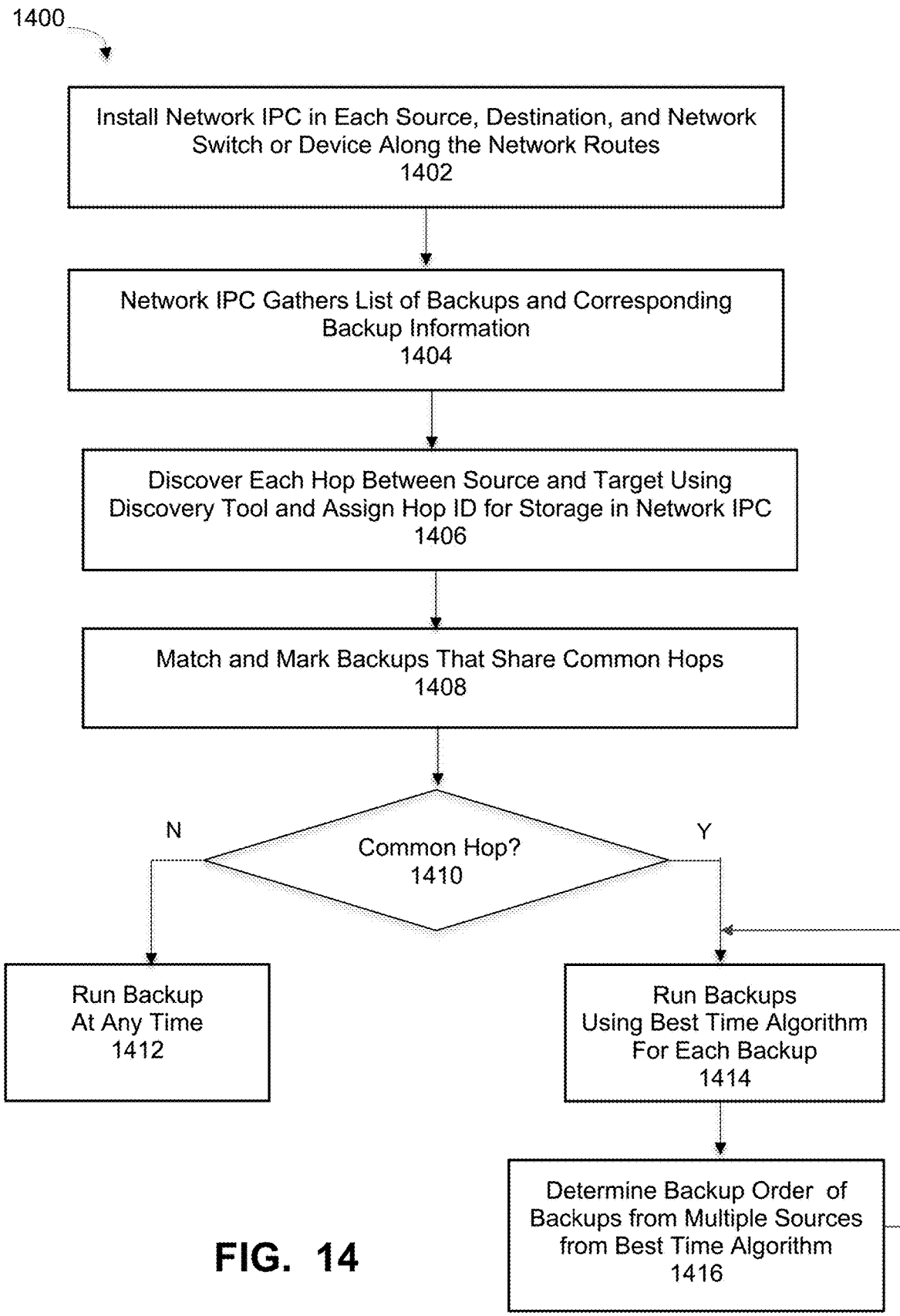
FIG. 14 is a flowchart that illustrates a method of optimizing a bottleneck that exists between a source and target, under some embodiments.

To optimize around any bottleneck that might exist somewhere between a source and target (e.g., along any hop or in any device), the network IPC process performs a method such as shown in the flowchart of FIG. 14.

Process 1400 starts with an installation or pre-installation of the network IPC in each in each source, destination, and switch/interface device in the network, 1402. The network IPC process then gathers a list of backups that exist across all N sources and their corresponding N or M targets. The list of backups includes information comprising the size of each backup, the target information, and any other relevant backup information, 1404. The network IPC then discovers each network link (hop) between each source and target using a traceroute or other network discovery tool, and each hop is given a unique identification (ID, hash, etc.) that is recorded within the network IPC, 1406.

The network IPC will then match all backups that share common hops regardless of their source or target, 1408, and these backups are marked so they can be sorted and optimized using the Best Time Algorithm. With respect to the matching process, each network hop will have a unique identifier that is used to match them between backups. For example, in a traceroute, the IPv4 or IPv6 address that identifies a network hop will be the same if two or more backups happen to take the path that hits that network hop. Other ways to determine common routes might use MAC address or hostnames, and so on. Regardless of which method is used, the unique identifier is recorded from source and target, and any appropriate sort and match algorithm can then be used to determine backups that share a common route, which can be referred to as 'shared backups.'

In step 1410, process 1400 determines if there is a common hop for any of the backup operations. Backups that do not have a common hop with one another will be scheduled to run at any time, 1412, as these backups do not need to be run using the Best Time Algorithm. Backups that share at least one common hop are marked accordingly and then run using the Best Time Algorithm, 1414, such as described above in process 1050 of FIG. 10. The output of process 1050 will be used to determine which order the multiple backup operations should be performed for the multiple sources and targets, given the device/network constraints and historical information 1416.

With respect to step 1414, for each backup that shares a common route, the process performs the Best Time Algorithm on them separately and saves the output. With respect to step 1416, after all the backups that have a common route are run against the best time algorithm, the process then looks at the saved output and determines which backup should proceed first. The output of the Best Time Algorithm dictates when the backup should run (e.g., 12:00 AM-12:20 AM).

For a situation where two or more backups are supposed to run at the same time, the process can be configured to arbitrarily pick one the backups and rerun the Best Time Algorithm on it. For this second time rerun of the Best Time Algorithm, the input to the algorithm is modified such that the available bandwidth during the suggested time in the first run has zero (0) bandwidth available. Thus, as shown in FIG. 14, there is a loop from 1416 back to 1414 for this edge case.

The process continues this cycle of taking a backup and marking the bandwidth to 0 when two backups collide until (1) the conflict is resolved or (2) no possible overlap situation occurs. To accomplish this, the process looks back at the saved outputs of the Best Time Algorithm and chooses the sequence that had the least conflicts.

Figure 13:
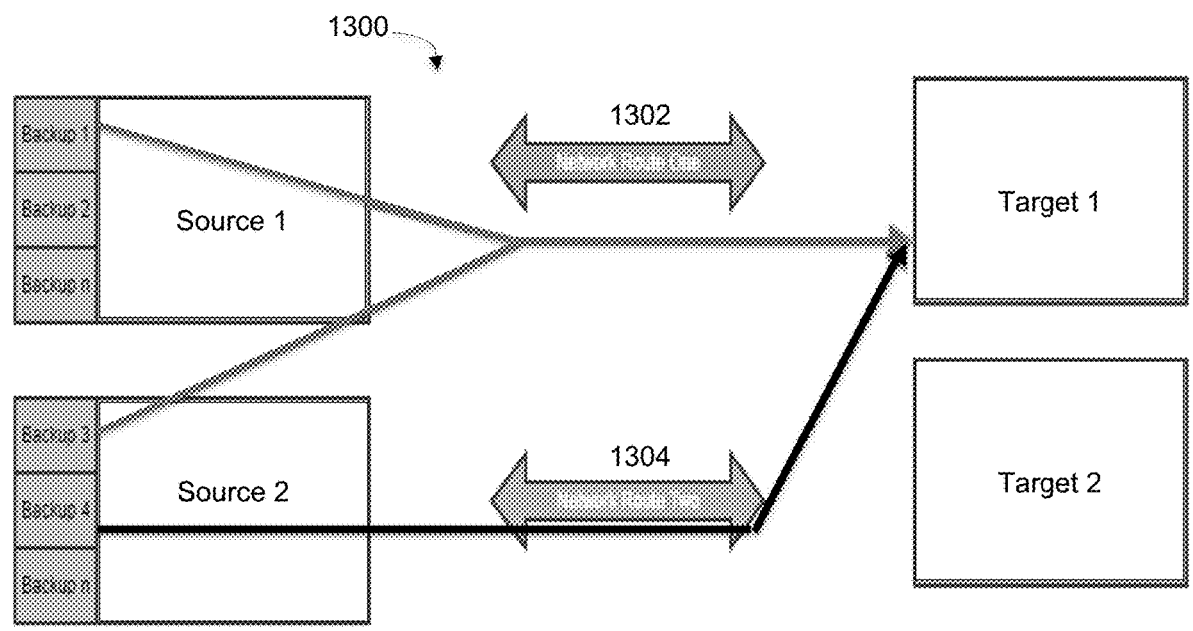
FIG. 13 illustrates the multi-backup, multi-source system of FIG. 12 with two network routes to transfer data.

Process 1400 thus determines an overall order of backups from different sources to different targets for a number of backup operations from each source. FIG. 13 illustrates an example application of the network IPC process for the multi-backup, multi-source system of FIG. 12. As shown in system 1300, the process has opened two routes, Network Route One 1302 and Network Route Two 1304 between the sources and targets. Two backups (Source 1, Backup 1 and Source 2, Backup 3) go to Target 1 over Network Route One, and one backup (Source 2, Backup 4) go to Target 1 over Network Route Two.

As shown in FIG. 13, many potential different routes each comprising different hops link the sources and targets. Some backups may use common hops within a route or common routes. In this case, the process 1400 uses the Best Time Algorithm to determine the proper backup order to optimize scheduling in order to avoid conflict or bottlenecks within the common network route. For purposes of description, a route comprises the entire path between the source and target with all devices and segments in between; a hop is an individual switch or device within a route, and a link or segment is interchangeable with a hop and represents a portion or subset of the route.

As shown in FIG. 14, in the no common hop case, the process runs the revised Best Time Algorithm and determines that no backup on a source has any common hop with any other backup at that particular time. Thus, as shown in the example of FIG. 14, Source 2, Backup 3 has no common route with any other backup at the time that the backup is scheduled. In this case, Backup 3 can run at any time, as there are no other backups as far as the process knows that will cause issues with the transfer of data to Target 1. It should be noted that network routes may be dynamic in that they change depending on the hops, thus backups that have not common route at one time, may a common route at another time. The determination of a common route is made at the time of the backup.

In the common hop case, two or more backups need to be transferred over at least one shared part of a network route. The source and targets could be the same or different, and regardless, they will always share a common network route. This potential bottleneck situation is addressed by the Best Time Algorithm process being applied to each backup from each source (multi-backup, multi-source) to the one or more targets. From the example above, the network IPC process collects information about Network Route One, 1302 and determines that it is a common route for two backups: Source 1, Backup 1 and Source 2, Backup 3. For purposes of illustration, the described example will show only two backups, but in practice there may be order of tens to hundreds of backups from each source attempting to run on common routes.

FIG. 15A is a table 1500 that illustrates an example time window of available bandwidth across Network Route One, under an example embodiment. For this example, assume Source 1, Backup 1 needs to backup 100 GB of data, and Source 2, Backup 3 needs to backup 80 GB of data. As shown in FIG. 15A, four transfer windows from 12:00 PM to 1:20 PM are available and each have different rates (available bandwidths) and different capacities (maximum amounts of data transferable). The transfer window times and characteristics of FIG. 15A are shown for purposes of illustration only, and any other number and duration of transfer windows may be used. As shown for this example, the different time windows may exhibit different rates and capacities due to several factors, such as network traffic, background processes, peak or off-peak demand times, and so on.

FIG. 15B is a table 1520 that illustrates the time required to complete two backup operations under a straight backup schedule, under an example embodiment. As shown in FIG. 15B Backup 1 and Backup 3 (from FIG. 13) are both scheduled to start transferring data at the start of their respective backup windows, i.e., 12:00 PM, and Backup 1 involves 100 GB and Backup 3 involves 80 GB. Since they are using the same route, and this transfer window has maximum of only 30 GB data transferable during the window, Backup 1 will transfer the max available (30 GB) and Backup 2 will not be able to transfer any data. Thus, in this case, one backup is left short and the other one does stalls entirely. The leftover data for Backup 1 then uses the next window (12:20 PM to 12:40 PM), and completes but leaves Backup 3 short. This pattern can then continue throughout the remaining windows and takes a relatively long time to backup all of the data (e.g., 44 minutes in this example).

Figures 15C, 16:
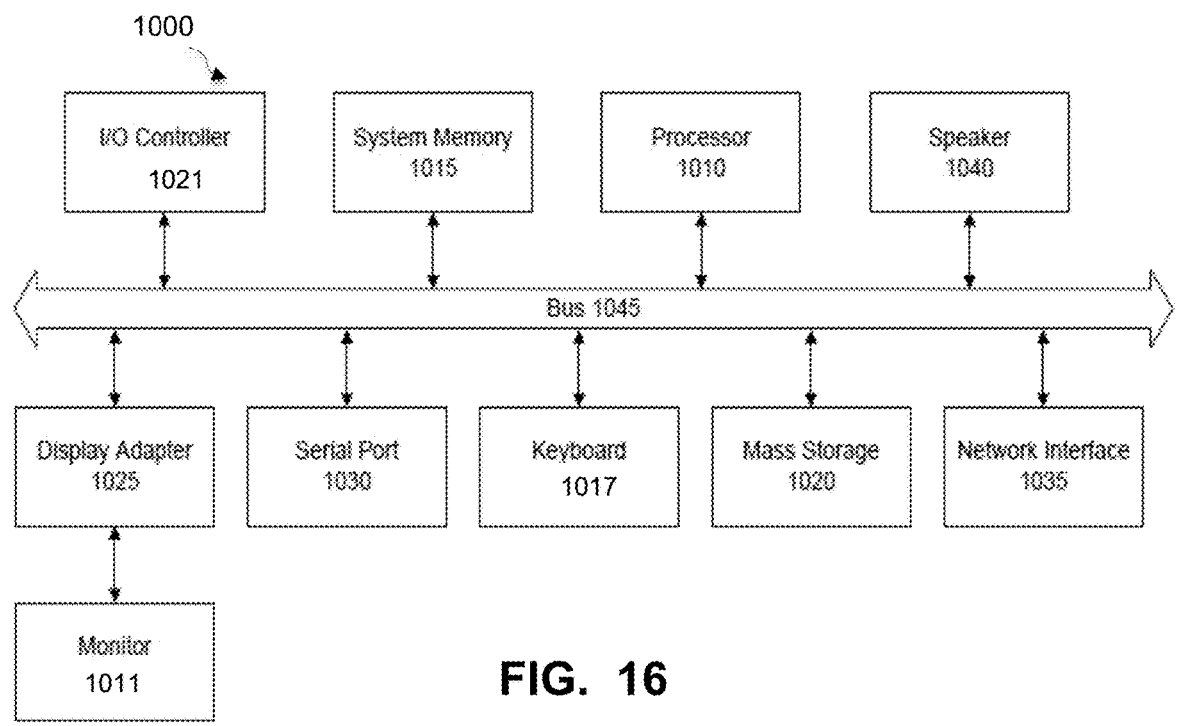
FIG. 15C is a table that illustrates the time required to complete two backup operations under a multi-backup, multi-source network IPC process, under an example embodiment.
FIG. 16 is a system block diagram of a computer system used to execute one or more software components of a multi-backup network informed policy creation process, under some embodiments.

FIG. 15C is a table 1530 that illustrates the time required to complete two backup operations under an improved Best Time Algorithm backup process, under an example embodiment. For this embodiment, the Best Time Algorithm or FIG. 14 is used to determine an optimum order and start time for each of example Backups 1 and 3. In this case, the backups are started later, that is, the 12:20 PM backup window rather than the 12:00 PM backup window. However, because the rates and capacities are higher for this second window than the first window, both Backups 1 and 3 can complete together within this window plus the 12:40 PM window, as required. As shown for this example, 32 minutes is required to backup all of the data resulting in an example savings of 12 minutes in overall data transfer time and impact to the overall network.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

The network of FIG. 1A may comprise any number of individual client-server networks coupled over the Internet or similar large-scale network or portion thereof. Each node in the network(s) comprises a computing device capable of executing software code to perform the processing steps described herein. FIG. 16 shows a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing backup operations for a data protection system having a plurality of sources backing up data to one or more targets through a plurality of backups, comprising:
    determining if any two backup operations share a common route between a source and a target for transferring data within a defined data transfer period comprising one or more individual backup windows, and denoted as shared backups;
    determining, for each shared backup:
        a size of a dataset to be saved in each shared backup,
        an available bandwidth in each transfer window of the one or more transfer windows for transfer data between the source and target,
        an order of the backup operations based on first ordering the backups based on decreasing dataset size and second ordering the transfer windows in order of decreasing bandwidth; and
    matching the backups to the transfer windows in accordance with the first ordering and second ordering.

2. The method of claim 1 further comprising backing up at any time during the defined data transfer period, data for any backup operations not sharing a common route with any other backup.

3. The method of claim 1 further comprising performing a network discovery operation to discover network hops between each source and corresponding target to identify and annotate the shared backups.

4. The method of claim 3 wherein the network discovery operation comprises one of Address Resolution Protocol (ARP), Internet Router Discovery Protocol (ICMP), or traceroute, and wherein the network hops comprise links between network devices along a route or path from a source to a target.

5. The method of claim 4 further comprising:
    determining, for each network device, device parameters including: available bandwidth, port speed, and historical transmission information; and
    collecting network traffic information including network bandwidth, and a network uplink speed for each backup of the shared backups.

6. The method of claim 5 wherein the data transfer period comprises a plurality of transfer windows defined by a network protection policy for performing backups at a specified time of day for a maximum period of time.

7. The method of claim 6 wherein each backup comprises a plurality of stages comprising:
    taking a snapshot copy of a respective dataset from a source;
    transferring the dataset to a specified target, tiering of the dataset to cloud storage, or replicating the dataset to secondary storage; and
    initiating a corresponding backup after the snapshot copy taking step.

8. The method of claim 4 further comprising:

determining, for each backup of the plurality of backups, a size of each dataset to be backed up by the respective backup;

monitoring a flow of data between the source and target for the respective backup; and determining an optimum time within the plurality of transfer windows based on the dataset size and the historical transmission information for each backup of the plurality of backups, wherein the historical information is used to establish bandwidth data used to derive the respective bandwidth capacities of each transfer window, and further wherein the optimum time represents a time to initiate the backup operation that results in a shortest data transfer time over the defined data transfer period.

9. A computer-implemented method of optimizing backup operations for multiple datasets from backed up from multiple sources to one or more targets in a data protection system, comprising:

discovering backup schedules and network links for the multiple sources backing up the multiple datasets;

first determining backups that share common network links within a scheduled backup to define shared backups;

determining a size of each dataset to be backed up in the shared backups;

iteratively ordering the shared backups within time windows of the scheduled backup based on respective dataset sizes and bandwidth capacities; and determining an optimum time within each the time windows to initiate the shared backups based on an ordering that minimizes an overall backup time within the scheduled backup.

10. The method of claim 9 further comprising:

first ordering the backups based on decreasing backup dataset size, with largest dataset ordered first;

second ordering the backups based on transfer windows based on decreasing bandwidth capacity, with highest bandwidth capacity first; and matching the largest dataset backup with the highest bandwidth capacity transfer window until at least one of: all of the plurality of backups are scheduled in at least one transfer window, or all transfer windows are occupied.

* * * * *